A. F. SALTLAMACHIA.
LAWN SPRINKLER.
APPLICATION FILED JUNE 29, 1908.
963,944.
Patented July 12, 1910.
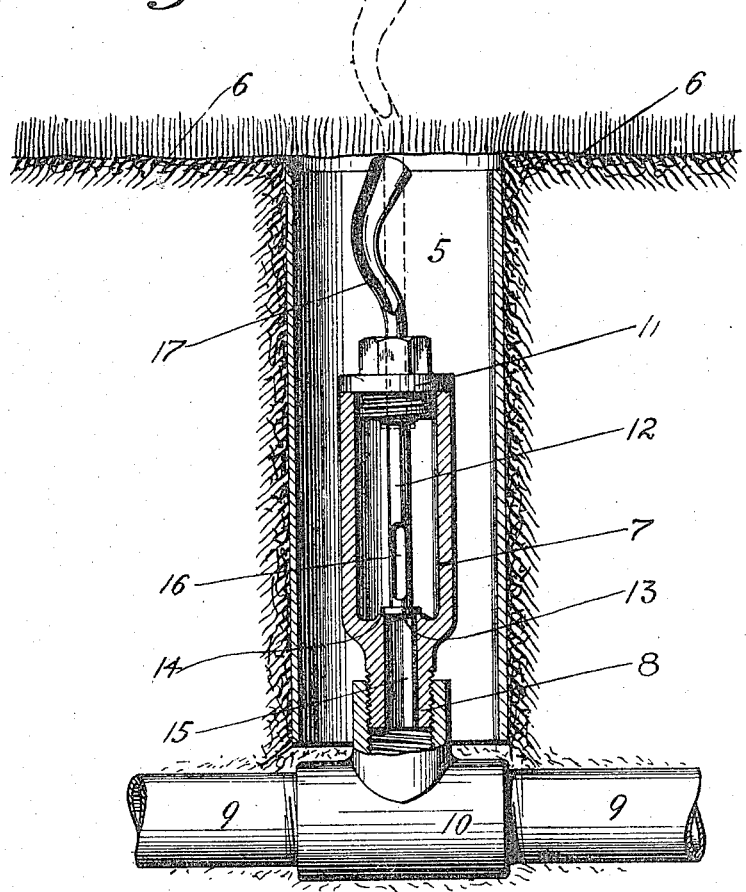
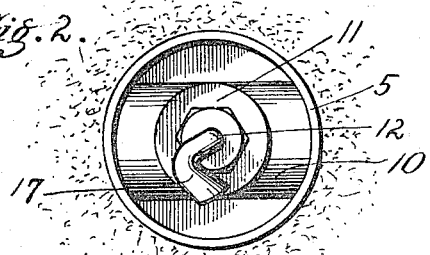
Witnesses
Rudolf Wildenhayn
James T. Burkelew
Inventor
Anthony F. Saltlamachia.
By Hazard & Krause
Attorneys.

UNITED STATES PATENT OFFICE.

ANTHONY F. SALTLAMACHIA, HUNTINGTON PARK, CALIFORNIA.

LAWN-SPRINKLER.

963,944. Specification of Letters Patent. Patented July 12, 1910.

Application filed June 29, 1908. Serial No. 440,787.

*To all whom it may concern:*

Be it known that I, ANTHONY F. SALTLAMACHIA, a citizen of the United States, residing at Huntington Park, in the county of Los Angeles and State of California, have invented new and useful Improvements in Lawn-Sprinklers, of which the following is a specification.

This invention relates to a lawn sprinkler adapted for placement on a lawn so that it is only necessary to supply water thereto in order to sprinkle the lawn on which it is placed.

The invention consists of a sprinkler adapted to be placed so that it is normally below the surface of the ground, being placed at an appropriate point in the lawn to sprinkle the desired area. The sprinkler is permanently connected to a water supply and it is only necessary to provide a controlling valve to admit the water to the sprinkler. Means are provided so that the head of the sprinkler rises above the surface of the lawn when the water is admitted and thereupon operates to throw the water over the lawn. As many of the sprinklers as may be desired may be used, all being connected to one common water supply.

In the accompanying drawings, forming a part of this specification:—Figure 1,— is a sectional elevation of my sprinkler as it appears in a lawn. Fig. 2,— is a plan view of the same.

In the drawings 5 designates a tube of sufficient diameter and length sunk into the lawn below upper surface 6 adapted to protect the sprinkler from becoming clogged by soil or other matter. The sprinkler is placed centrally within tube 5 and is composed of a sprinkling case 7 adapted at its lower end 8 for attachment to water supply pipe 9, a tee-fitting 10 being shown for the purposes of making this connection. Case 7 is closed by a plug 11 at its upper end, this plug being provided with an internal bore through which tube 12 passes. Tube 12 is revoluble and longitudinally movable in plug 11 so that it may move upward to the position shown in dotted lines in Fig. 1 and rotate in that position. In its normal position as shown in full lines the lower end of tube 12, which is open, is provided with a flange 13 rests upon a seat 14 around water inlet 15 in case 7. Tube 12 is slotted as at 16 directly above flange 13 so that any foreign matter such as small stones or moss which passes into the tube may find exit through the slot. The upper end of tube 12 is provided with a curved and half open trough portion 17 of the general configuration shown in the drawings so that the stream of water emerging through the tube is deflected thereby in both a radial and circumferential direction. The deflection in the radial direction serves to throw the water into a cone-shaped sheet when the tube is revolved while the deflection in the circumferential direction serves to force the tube into rapid revolution.

When the sprinkler has been placed in a lawn it is only necessary to open the water supply thereto when the tube 12 will be forced by the water pressure to its uppermost position as shown in dotted lines. The length of tube 12 is so designed that its upper portion rises above the lawn so that the discharge of the water therefrom is not interfered with. On account of the confiuration of portion 17 of tube 12 the tube is forced into a rapid rotation and the water is formed into an upwardly spreading conical sheet and is distributed over a large area. It will be understood that the configuration of portion 17 will determine the extent of the area sprinkled by one sprinkler provided the water pressure remains constant.

Having described my invention what I claim as new and desire to secure by Letters Patent is:—

1. A lawn sprinkler comprising a case adapted to be connected to a water supply, a longitudinally movable and rotatively mounted tube in said case, the lower end of said tube being open, a twisted trough-shaped blade connected to said tube, said tube being provided with a slot, a flange on the lower end of said tube, substantially as described.

2. A lawn sprinkler comprising a tubular well, a case in said well connected to a water supply, a longitudinally movable and rotatively mounted tube in said case, a twisted trough-shaped blade integral with said tube, said tube being open at its lower end and provided with a slot in its side wall, a flange attached to the lower end of said tube, a seat in said case with which said flange is adapted to coöperate, substantially as described.

3. A lawn sprinkler comprising a tubular well, a water supply pipe at the base of said well, a casing connected to said water supply pipe, means for closing the upper end of said casing, a tube longitudinally movable and rotatively mounted in said closing means, the lower end of said tube being open, a curved trough-shaped blade integral with said tube and terminating above said closing means, a flange on the lower end of said tube, said tube being slotted in its side wall above said flange, the slot being adapted to be closed by the case closing means when the sprinkler is in operation, substantially as described.

In witness that I claim the foregoing I have hereunto subscribed my name this 19th day of June, 1908.

A. F. SALTLAMACHIA.

Witnesses:
　EDMUND A. STRAUSE,
　OLLIE PALMER.